(12) United States Patent
Kirkwood

(10) Patent No.: US 8,530,114 B2
(45) Date of Patent: Sep. 10, 2013

(54) SOLID OXIDE FUEL CELL ELECTRODE SYSTEMS AND METHODS

(71) Applicant: Boeing Corporation, Chicago, IL (US)

(72) Inventor: Brad L. Kirkwood, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/752,300

(22) Filed: Jan. 28, 2013

(65) Prior Publication Data

US 2013/0137012 A1      May 30, 2013

Related U.S. Application Data

(62) Division of application No. 11/831,776, filed on Jul. 31, 2007.

(51) Int. Cl.
*H01M 4/76* (2006.01)
*H01M 8/00* (2006.01)

(52) U.S. Cl.
USPC .................. 429/535; 429/238; 429/400

(58) Field of Classification Search
USPC .................................... 429/535, 238
See application file for complete search history.

(56) References Cited

U.S. PATENT DOCUMENTS

| | | | |
|---|---|---|---|
| 6,416,876 B1 | 7/2002 | Deve et al. | |
| 7,083,759 B2 * | 8/2006 | Osada et al. | 419/23 |
| 2002/0114989 A1 * | 8/2002 | Allen | 429/44 |
| 2005/0053819 A1 | 3/2005 | Paz | |

FOREIGN PATENT DOCUMENTS

WO      WO 2006/101136      9/2006

OTHER PUBLICATIONS

Discontinuous entry; The American Heritage Dictionary of the English Language, 2007, [online], May 14, 2010; Retrieved from Credoreference using Internet URL: http://www.credoreference.com/entry/hmdictenglang/discontinous.

Whisker entry; The Penguin English Dictionary, 2007, [online], May 14, 2010; Retrieved from Credoreference using internet URL: http://www.credorefoerence.com/entry/penguineng/whisker.

Solid Oxide Fuel Cells; http://www.azom.com/details.asp?ArticleID=919, Jun. 1, 2007; 6 pages.

England, Diane M., Ph.D., "SOFC Interconnect Development", Semiannual Report, Jun. 6, 2003, pp. 12, West Henrietta, NY.

Karasek, Keith R., et al., "Normal-state resistivity of in situ-formed ultrafine filamentary Cu-Nb composites," J. Appl. Phys. 52(3), Mar. 1981, pp. 1370-1375, American Institute of Physics, Cambridge, MA.

Klein, J.D., et al., "Thermal behavior and strength of continuous filament Cu-Nb composites," J. Appl. Phys. 81(6), Mar. 15, 1987, pp. 2212-2217, American Institute of Physics, Cambridge, MA.

* cited by examiner

*Primary Examiner* — Barbara Gilliam
*Assistant Examiner* — Steven Scully
(74) *Attorney, Agent, or Firm* — Haynes and Boone, LLP

(57) ABSTRACT

A solid oxide fuel cell (SOFC) interconnect comprises a metal sheet with an air side and a fuel side in accordance with an embodiment of the present invention. The metal sheet comprises a metallic composite having a matrix. The matrix comprises a first metal. The metal sheet also comprises a plurality of discontinuous, elongated, directional reinforcement wires. The reinforcement wires comprise a second metal that is immiscible in the first metal. An oxidation protection layer is disposed on the air side of the metal sheet.

20 Claims, 4 Drawing Sheets

SOLID OXIDE FUEL CELL ELECTRODE SYSTEMS AND METHODS

CROSS REFERENCE TO RELATED APPLICATIONS

This application is a divisional application of U.S. patent application Ser. No. 11/831,776, filed on Jul. 31, 2007, which is incorporated herein by reference in its entirety.

TECHNICAL FIELD

The present disclosure relates generally to solid oxide fuel cells and, more particularly, to a metal-matrix or in situ composite for use as an interconnect in a solid oxide fuel cell.

BACKGROUND

Metallic plates used as interconnects between individual fuel cells of a solid oxide fuel cell can make the fuel cells quite heavy for aircraft flight applications. Interconnects may be made for example of stainless steel alloys. Solid oxide fuel cell systems fabricated from heavy gage, dense materials such as this are less attractive for long endurance aircraft propulsion applications because of their weight.

Stainless steel, while heavy, has other materials characteristics which make it suited for use in fuel cells. For example, stainless steel has resistance to hydrogen embrittlement (formation of hydrides), good resistance to oxidation, with fair creep strength and conductivity at temperatures above 800° C.

As a result, there is a need for a material to be used as a an interconnect in a solid oxide cell that has adequate structural and thermal/electrical conductivity characteristics at a lower weight than materials currently in use (such as stainless steel), while having adequate resistance to hydrogen embrittlement and oxidation.

SUMMARY

In accordance with an embodiment of the present invention, a method of fabricating an interconnect for a solid oxide fuel cell (SOFC), comprises melting a charge comprising copper and from 20 to 38 volume percent molybdenum and then cooling to form an ingot comprising a metallic composite. The metallic composite has a copper matrix and spheroids dispersed within the matrix. The method also includes forging the ingot followed by a first anneal to form a rough bar of metallic composite, swaging the rough bar followed by a second anneal to form a plurality of rods suitable for drawing, drawing the plurality of rods followed by a third anneal to form a plurality of wires of the metallic composite, bundling and canning to form a sheet of the metallic composite. The formed sheet comprises a plurality of discontinuous, elongated, substantially uniaxial reinforcement fibers formed from the spheroids, and is suitable for use as an interconnect in an SOFC.

In accordance with another embodiment, a solid oxide fuel cell (SOFC) interconnect comprises a metal sheet with an air side and a fuel side. The metal sheet comprises a metallic composite having a matrix. The matrix comprises copper. The metal sheet also comprises a plurality of discontinuous, elongated, directional reinforcement fibers dispersed in the matrix. The reinforcement fibers comprise molybdenum. An oxidation protection layer is disposed on the air side of the metal sheet.

In accordance with another embodiment, a solid oxide fuel cell (SOFC) comprises a plurality of individual fuel cells. Each individual fuel cell comprises an anode layer, a cathode layer, and a catalyst layer between the anode layer and the cathode layer. The SOFC also comprises a plurality of interconnects separating adjacent individual fuel cells. Each one of the plurality of interconnects comprises a metal sheet comprising a metallic composite. The metallic composite has a matrix comprising copper or silver and a plurality of discontinuous, elongated, directional reinforcement fibers dispersed in the matrix. The reinforcement fibers comprise molybdenum.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Figure 1:
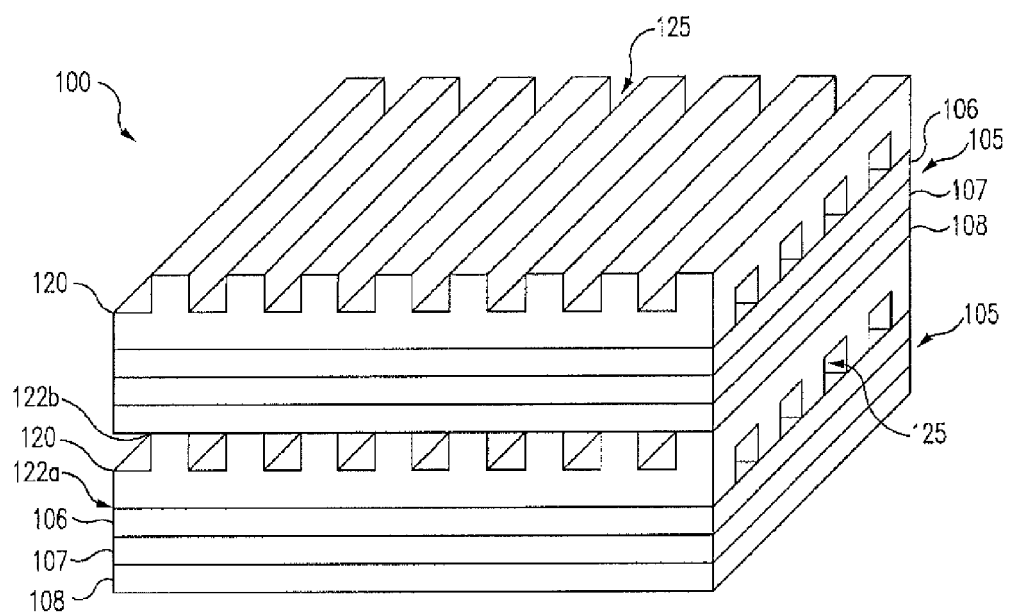
FIG. 1 shows a block diagram illustrating a detail of a portion of a solid oxide fuel cell in accordance with an embodiment.

FIG. 1 shows a detail view of a solid oxide fuel cell 100 in accordance with an embodiment of the present invention. The solid oxide fuel cell 100 may include a plurality of individual solid oxide fuel cells 105. Each individual fuel cell may include an anode 106, an electrolyte 107 and a cathode 108. The electrolyte 107 may comprise a partially stabilized zirconia (PSZ), for example an yttrium-stabilized zirconia (YSZ). The anode 106 may comprise a surmet (sur-metal), for example nickel-PSZ. The cathode 108 may comprise lanthanum chromite (LaCrO3). In other embodiments, the anode 106, catalyst 107 and cathode 108 may comprise any other suitable materials for use in a solid oxide fuel cell.

Each individual fuel cell may be separated from neighboring individual fuel cells by an interconnect 120. The interconnect may seal neighboring individual fuel cells from one another, at least along the entire interface 122a,b where the interconnect and adjacent individual fuel cells face one another.

The interconnects 120 may have passages or channels 125 extending along the interface between the anode or cathode and the adjacent interconnects. The passages or channels 125 may permit either fuel or air to pass through the opening, across the surface of one of either the anode or cathode, to permit operation of the solid oxide fuel cell. For example, the interconnect/anode interface 122a may have passages for fuel, for example H2. The cathode/interconnect interface 122b may have passages 125 for air. The interaction of the air, individual fuel cell components and the hydrogen fuel generate a electrical current flow from the anode to the cathode. The interconnects act as conductors to channel the generated power to the electrical load.

Figure 6:
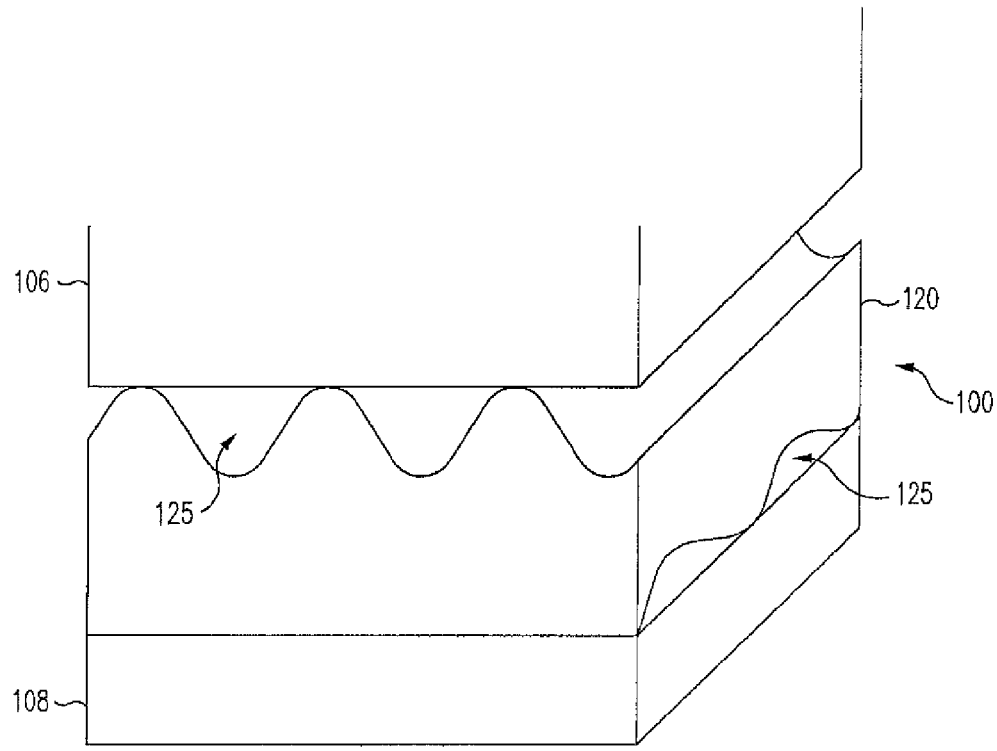
FIG. 6 shows an interconnect of a solid oxide fuel cell in accordance with an embodiment.

The channels 125 may be arranged to run at approximately 90 degree angles to each other, to facilitate the air inlet and outlet and the fuel inlet and outlet on various sides of the fuel cell. In some embodiments, the channels may be etched or machined. In other embodiments, the channels may be formed in a pressing or rolling process to have a smoother profile, for example an approximately sinusoidal or wave form, as shown in FIG. 6.

The interconnects 120 may comprise a composite, for example a metallic composite or in situ metallic composite. The composite may include a reinforcement material, for example molybdenum or molybdenum alloy, dispersed in a matrix material, for example copper or silver. A layer of rhenium or iridium disposed on the surface of the interconnect will provide protection against oxidation. Molybdenum is used because for several reasons, for example, it does not form hydrides, is not soluble in either copper or silver, has good ductility, has a high tensile strength after wire drawing and maintains this strength to temperatures above 1000 degrees C., and has a moderate density when compared to other refractory or noble metal materials.

Figure 2:
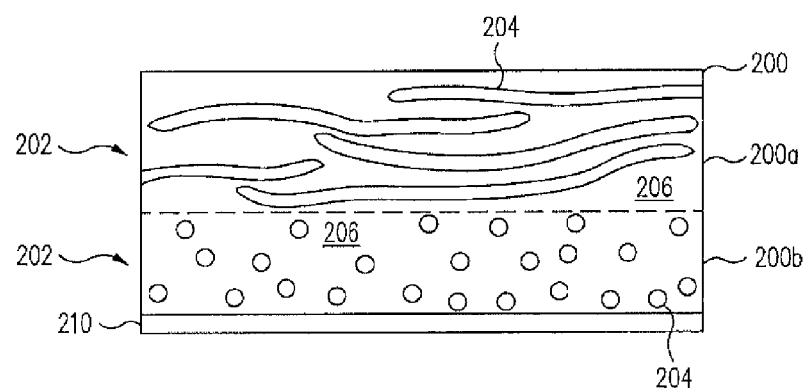
FIG. 2 shows a cross-section of an interconnect of a solid oxide fuel cell in accordance with an embodiment.

FIG. 2 shows a cross-section of a metal plate 200 for use as an interconnect 120 (see FIG. 1) in accordance with an embodiment of the present invention. The metal plate 200 may comprise a composite 202, for example a metallic composite or in situ metallic composite. The composite 202 may comprise a reinforcement material 204, for example molybdenum, in a matrix material 206, for example copper or silver. The reinforcement material 204 may comprise an alloy of molybdenum with small amounts of titanium (Ti), zirconium (Zi) or Hafnium (Hf), for example up to about 1% of one or more of Ti, Zi or Hf, to further strengthen the molybdenum. These elements are also immiscible in the copper or silver matrix and segregate to the molybdenum dispersoids in the solidification from the melt and become alloying additions in the molybdenum reinforcement fibers after drawing.

In an example embodiment, the matrix material 206 may provide the metal plate 200 with a desirable conductivity for use as an interconnect in an SOFC, while the reinforcement material 204 may provide reinforcing strength to the matrix 206. In an example embodiment, the matrix material 206 and the reinforcement material may be selected to have desirable resistance to hydrogen embrittlement.

The reinforcement material 204 dispersed in the matrix 206 may be in the form of discontinuous, elongated, directional reinforcement wires. The reinforcement wires may provide reinforcing strength to the metal plate 200 structure. The plate 200 may be formed by binding two separate plates 200a, 200b together, for example hot isostatic pressing (HIP) or other suitable process. The two separate plates 200a and 200b may be arranged so that a direction or axis of the reinforcement wires of one plate 200a are arranged along a different axis from the reinforcement wires of the other plate 200b, for example at about ninety degree angles with respect to one another. In other words, the plate may comprise a 0/90 metallic composite or a biaxial metallic composite. In FIG. 2, the reinforcement material 204 in layer 200a runs from left to right, the molybdenum or molybdenum alloy 204 runs perpendicular with the plane of the figure—the cross-sections of those wire reinforcement sections are shown as small circles.

The plate 200 may also include an oxide protection layer 210 of one of either rhenium or iridium. Where the channels are to be etched or machined in the plate, the rhenium or iridium may be vapor deposited onto the composite. Where the channels have been formed by rolling or shaping, the rhenium or iridium layer may co-rolled or hot isostatically pressed (HIP) onto the sheet of composite.

Figure 3:
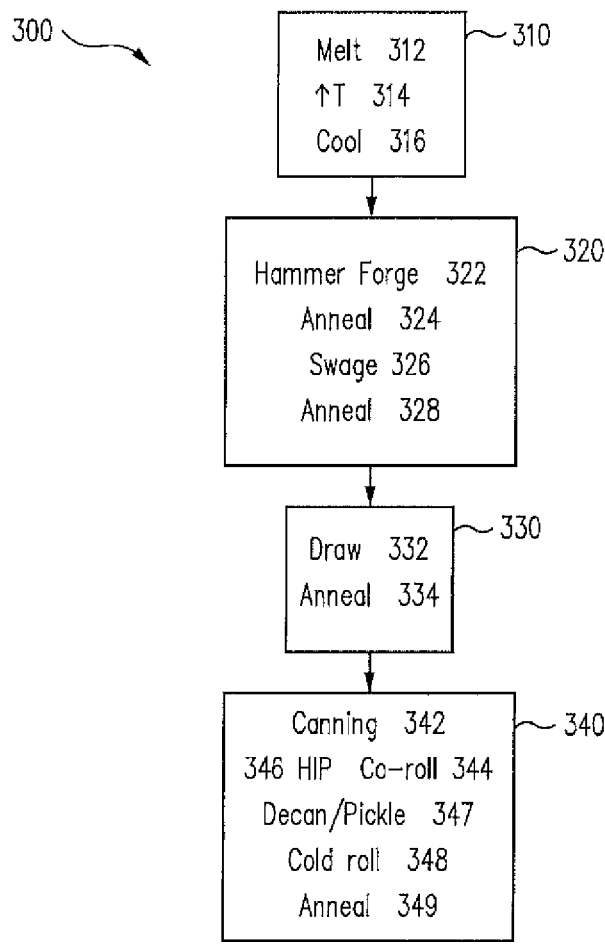
FIG. 3 shows a flow diagram illustrating a method of fabricating a metal plate in accordance with an embodiment.

FIG. 3 illustrates a method 300 of fabricating a metallic composite having a reinforcement material dispersed within a matrix, for example reinforcing molybdenum or molybdenum alloy dispersed in a copper or silver matrix in accordance with an embodiment of the present invention. The method may include forming 310 an ingot, forming 320 rods from the ingot, the rods being suitable for cold-drawing, forming 330 wires from the multiple rods, and forming 340 a sheet or plate from the wires.

Forming 310 the ingot may include melting 312 a charge. The charge may be, for example copper or silver to form the matrix and molybdenum or a molybdenum alloy to be dispersed in the matrix. The matrix material may be copper pellets and the molybdenum or molybdenum alloy may be provided in the form of molybdenum plugs.

In an example embodiment, the amount of molybdenum may be determined, at least in part, so that the sheet or plate of composite to be ultimately formed by the method 300 will have a coefficient of thermal expansion (CTE) that matches the coefficient of thermal expansion of the material used in the individual fuel cells, for example the PSV, Ni-PSV and/or LaCrO3. The charge may include in a range of 20-38 volume percentage of molybdenum or molybdenum alloy in a copper or silver matrix. In an example embodiment, the CTE of the resultant composite may have a CTE in a range from about 11 to about 14 microns per meter-degree Kelvin as discussed below with respect to FIG. 5A.

The charge may be melted 312 by arc-melting. The copper may melt at about 1083° C. The temperature may be further increased 314 until the molybdenum or molybdenum alloy dissolves into the copper melt, which may happen at about 2585° C. The temperature may further be increased 314 to a temperature with about 100° C. of superheat above the melting temperature of the molybdenum or molybdenum alloy, for example to about 2685° C.

The arc or other heat source may then be removed and the melted charge cooled 316. The melt may be cooled rapidly, for example on a conductive, water cooled, copper hearth. The cooling should take place at a rate of about a few hundred degrees per minute. The cooling should take place at a rate such that the nucleation and growth process of molybdenum spheroids within the matrix occurs within about a minute. If the cooling rate is too slow, the molybdenum precipitates may become too big which may result in there being insufficient dispersion of molybdenum precipitates in the matrix.

During cooling, the melt may precipitate a pure molybdenum or molybdenum alloy phase until the temperature reaches the melting point of the matrix material, about 1083.4° C. in the case of copper. The remaining matrix material may freeze at that point, forming a solidified ingot of molybdenum or molybdenum alloy dispersed within a matrix material.

In an example embodiment, the resultant microstructure may include a volume percentage of molybdenum or molybdenum alloy spheroid precipitates dispersed in the matrix. The molybdenum or molybdenum alloy may be present with a volume percent in a range from 20 to 38 volume percentage of the composite, for example about 30 volume percentage of the composite.

A rough bar may then be formed from the solidified ingot by hammer-forging 322 and annealing 324. The rough bar may then be swaged 326, for example cold-swaged, and annealed 328 to form 320 a plurality of rods suitable for cold drawing. The rods may be, for example, about two feet long and roughly about a quarter inch in diameter.

The rods may be drawn 332, for example cold-drawn, with a 20-30 percent draw ratio. After drawing 332, the rods may be annealed 334, for example at about 800° C. The annealing 334 may be performed at a temperature below the melting temperature of the matrix. The annealing 334 may be performed under vacuum or Ar/4% H2. The rods may be repeatedly drawn 332 with intermediate anneals 334 a number of times sufficient to form 330 wires having a desired radius with a microstructure of the matrix with long discontinuous molybdenum reinforcement fibers. For example, the rods may be drawn often enough to form 330 wires on the order of a few mils (for example 0.002" to 0.003") or as small as down to half a mil (0.0005").

The resultant wires may have discontinuous, elongated, directional wire reinforcements dispersed in the matrix formed from the molybdenum or molybdenum alloy spheroids which had been present in the original ingot prior to swaging, drawing and annealing. The discontinuous wire reinforcements may increase the strength of the molybdenum/copper composite wires and increase the strength of the sheets or plates to be formed 340 from the wires over that of the matrix at room temperature and at elevated temperatures to 1000 C.

To form 340 the sheets, the wires may be canned 342, for example by bundling wires together in an appropriately shaped can, for example a flat sheet or plate shaped can. The bundled/canned wires may be subjected to co-rolling 344 and/or hot isotropically pressing (HIP) 346, for example at the annealing temperature of 800° C., to sinter the copper wires together into a flat sheet or plate which may be, for example, from about 1 mil to about 1.5 mil thick.

The sheets may then be removed 347 from the can by acid pickling in HNO3 or decanning. The sheets may be finished by cold rolling 348 in the direction of the molybdenum wire fibers through a 10% reduction followed by annealing 349 at a lower temperature, for example 400° C. The final annealing 349 operation may anneal the copper matrix while leaving the molybdenum wires with residual cold work for increased strength. The sheet may be finished with a final 10% cold reduction to increase the strength of the wires. The sheet or plate may then be cleaned, for example in dilute HNO3 acid, prior to use. The resultant sheet or plate may be a composite having discontinuous, elongated, directional reinforcement wires dispersed in a conductive metal matrix. The wires may be molybdenum or a molybdenum alloy and the matrix may be copper or silver.

The density of the resulting sheet or plate of composite at 20-38 volume percent reinforcement wires may be in a range from about 9.2 to about 9.5 g/cm3, or about 15% to 18% more dense than "316 Stainless Steel". However, the composite may have a yield strength in excess of 200 ksi at room temperature and 100 Ksi at 800° C., which is significantly higher than the yield strength for stainless steel at those temperatures. Therefore, the interconnects made from the composite may be made thinner and lighter than the stainless steel interconnects, despite the higher density. The metal composite may have a conductivity in a range from about 41 to about $51 \times 10^6$ 1/ohm-m at room temperature, significantly higher than stainless steel.

Figure 4:
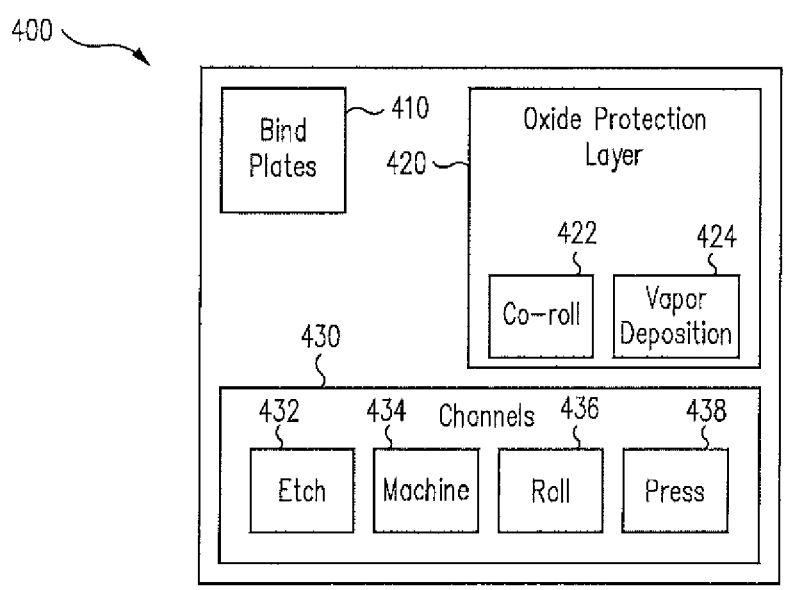
FIG. 4 shows a flow diagram illustrating a method of fabricating an interconnect for use in a solid oxide fuel cell.

FIG. 4 illustrates a method of further processing sheets of plates of composite to fabricate 400 interconnects for use in an SOFC in accordance with an embodiment of the present invention. In an example embodiment, two sheets or plates of composite may be bonded 410 together. The sheets or plates may be bonded 410 to form a 0/90 lay-up metal-matrix composite or biaxial lay-up metal-matrix composite. Having the reinforcement wires of the two layers run at different angles may increase the strength of the interconnects in an SOFC in two directions to withstand pressure and thermal stresses. The plates may be bonded 410, for example by HIP at about 900 degrees under pressure.

The surfaces of the two-layer plate may be etched 432, machined 434, rolled 436, pressed 438 or otherwise processed to form 430 channels. The channels may define fuel or air passages in an assembled SOFC. Etching 432 or machining 434 may result in channels with generally quadrilateral cross-sections as shown in FIG. 1. The channels may be about 1-2 mm deep and about 1-2 across. Rolling 436, pressing 438 or otherwise processing may result in channels having a less-discontinuous profile, for example a wave or sinusoidal profile, as shown, for example, in FIG. 6 below for an embodiment. The channels may be about 1-2 mm across from peak to peak and about 1-2 mm deep. The channels on one side may run at approximately 90 degree angle with respect to the channels on the other side which may accommodate the flow of fuel and/or air in an assembled SOFC. The channels may run in the direction of the reinforcement fibers on the side of the plate on which the channels are on. Having the channels run in the direction of the fibers on the side on which the channels are formed may facilitate the ease of forming of the channels.

In an example embodiment, an oxide protection layer, for example rhenium or iridium, may be disposed 420 on at least one side of the sheet or plate. The oxide protection layer may be a thin layer, for example less than about 0.001". The manner and order of applying the oxide protection may depend, at least in part, on the form of the channels in the interconnect. For example, in the event that the channels are etched 432 or machined 434, the oxide protection layer may be disposed 420 onto the sheet or plate of in-situ metallic composite by a vapor deposition process 424 after the channels have been formed. In the event that the channels are to have a more continuous profile, the oxide protection layer may be disposed 420 onto the sheet by co-rolling 422 or hot isostatically pressing (HIP) the in-situ metallic composite sheet onto a thin film of rhenium or iridium, for example before rolling 436, pressing 438 or otherwise processing the sheet to form the channels.

In an example embodiment, the use of copper or silver as the matrix and molybdenum or molybdenum alloy in the composite may be desirable for their resistance to hydrogen embrittlement since neither copper nor molybdenum form hydrides by an exothermic reaction with hydrogen near room temperature. The formation of hydrides might otherwise render a ductile alloy to be as brittle as glass, with no ductility or fracture toughness and may render an alloy to be unsuitable as a structural material in the presence of hydrogen. Other refractory and noble platinum metals, for example Ti, Zr, W, Mo, V, Ta, Hf, Pt, Pd, Rh, Re, Ru, Ir and Os may experience the formation of hydrides when exposed to hydrogen near room temperature. Using molybdenum and copper may provide a desirably strong and non-brittle structural material for use in a solid oxide fuel cell.

The use of a layer of one of rhenium or iridium may be desirable to the substrate, for example electrode, from oxidation. Providing a layer of rhenium or iridium on at least one side of an interconnect, for example on the air or oxygen side, of the interconnect, may protect the matrix material from oxidation or internal oxidation of the molybdenum reinforcement fibers. In one embodiment, iridium may be preferred because it may also be immiscible in solid copper and may not dissolve and/or diffuse in the copper during high temperature exposure, which might otherwise weaken its ability to protect the copper from oxidation. Iridium may form an adherent oxide to provide a slow oxidation rate, protecting the matrix material from high temperature oxidation and the reinforcement wires from internal oxidation. Pure iridium may also have excellent ductility and may resist thermal cracking that might otherwise create a short circuit oxidation path to the copper matrix to oxidize beneath the iridium coating in the area of a crack. In other embodiments, rhenium may be used. Molybdenum without a protective layer of rhenium or iridium, while having excellent high temperature strength, might otherwise have problems with oxidation at high temperatures because its oxide will volatilize above 900° C., leaving it unprotected to rapid oxidation. In embodiments of the system described herein, the molybdenum wires may be protected by the copper matrix and the rhenium or iridium coating.

In an example embodiment, a solid oxide fuel cell with copper-molybdenum composite interconnects or plates may be used in any application in which the use of a solid oxide fuel cell is considered desirable. For example, the increased strength for lighter weight plates may make the use in fuel cells for automobiles desirable as a means of increasing fuel economy and reducing emissions. The lighter weight may make such a fuel cell desirable for use in an aircraft, for example in an unmanned aerial vehicle. A lighter weight fuel cell may increase the range and endurance of an aircraft, for example high altitude, long endurance aircraft. For every one hundred pounds of weight loss, the endurance of an air vehicle may be increased by about 0.1 days.

In an example embodiment, molybdenum and copper may be immiscible, for example completely immiscible, in each other. In other words, copper and molybdenum do not dissolve into each other or form a solid-solution or an intermetallic phase between them on their phase diagram. This means that a cast ingot of an alloy of these two elements creates two distinct phases; one that is pure copper and the other that is pure molybdenum with no potentially brittle inter-metallic phases or a solid solution transition.

In an exemplary embodiment, the immiscibility of the molybdenum in the matrix may provide increased strength. Having closely-spaced reinforcement wires within the matrix may prevent dislocation motion within the matrix. Because the molybdenum or molybdenum alloy may be immiscible in the matrix material, the reinforcements may not coarsen at high temperatures, which may provide increased strength over other materials, such as stainless steel whose microstructures coarsen, at the operating temperatures of an SOFC, for example between 750° C. and 900° C. Furthermore, since the reinforcement material is immiscible in the high-conductivity matrix material, the conductivity of the composite may also have a high conductivity.

Both copper and molybdenum may be sufficiently ductile, for example very ductile, at slightly elevated temperatures. As a result, the metals may be rolled, swaged, cross rolled or drawn with intermediate anneal heat treatments to form a in-situ metallic composite of 20 to 38 volume percent molybdenum reinforcement wires dispersed in a pure copper matrix. These composites may have a room temperature resistivity of from about 2.0 to about 2.4 micro-ohm-cm, depending on the volume percent of molybdenum fiber reinforcement, and degree of recrystallization by annealing in the copper matrix. The resistivity of the material may increase at higher temperatures, for example climbing to about 8 micro-ohm-cm at about 750° C. The fine dispersion of aligned molybdenum or molybdenum alloy wires may give the metal composite a yield-strength in excess of about 200 Ksi at room temperature and in excess of 100 Ksi at operating temperatures of about 800° C.

Molybdenum is a refractory material and may have a sufficiently high temperature strength, for example excellent high temperature strength that does not begin to weaken until above 1100° C. Since Molybdenum is not miscible in the copper alloy matrix, the reinforcement may not coarsen and/or weaken when exposed to high operating temperatures, for example operating temperatures in a range from 800-900° C. The high conductivity and high elevated temperature strength may permit the cell interconnects to be sized at about 0.015", which may result in a 50 percent weight reduction in the interconnects or plates which may correspond to about a 25% weight reduction in an SOFC, in comparison with a solid oxide fuel cell system using different metals, for example stainless steel.

In a given application or embodiment, the particular materials to use as the matrix and reinforcement wires and the volume percent of the materials may be selected, at least in part, to have desirable properties for a given application or embodiment. The desirable properties may be a coefficient of thermal expansion (CTE) that matches the CTE of the materials used in the individual fuel cells. The desirable properties may include good electrical conductivity or bulk thermal conductivity.

Figure 5A:
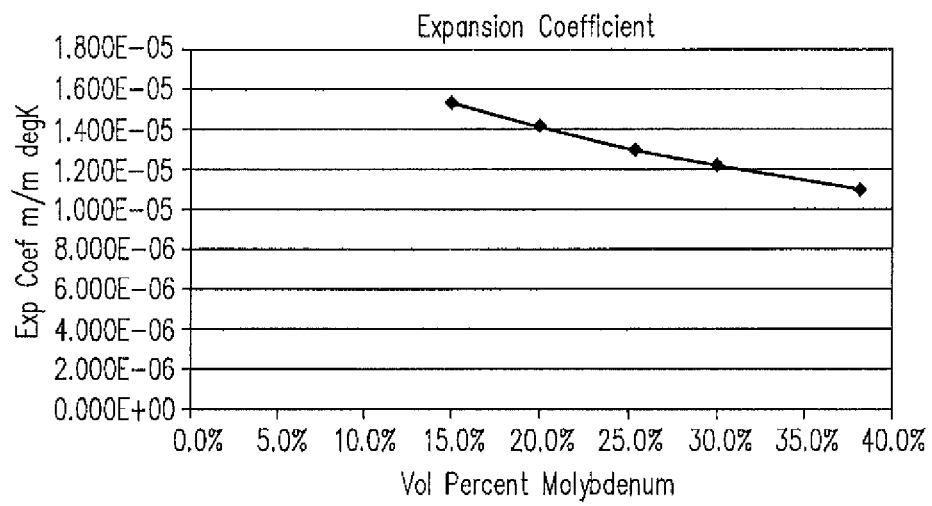
FIGS. 5A, 5B and 5C show the thermal expansion coefficient, bulk thermal conductivity and RT electrical conductivity versus percent volume of molybdenum in a copper matrix in example embodiments.
Figure 5B:
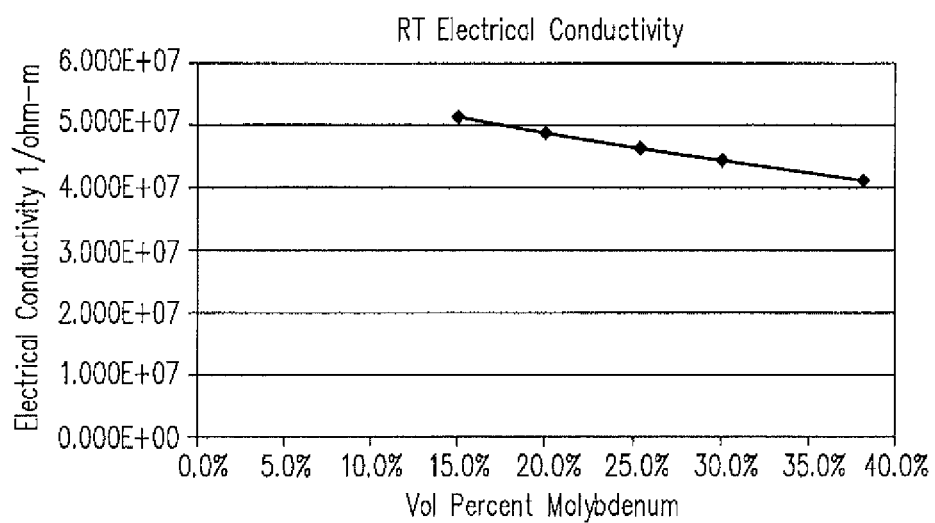
Figure 5C:
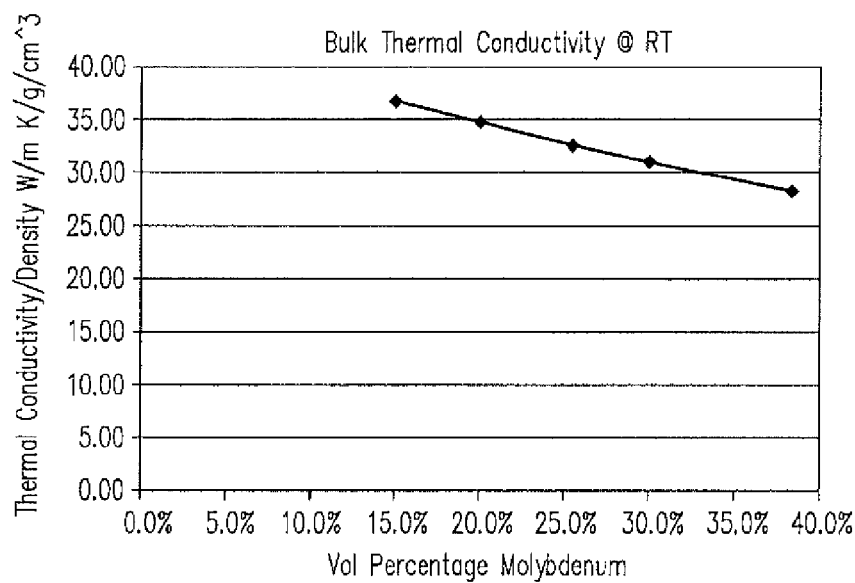

FIGS. 5A, 5B and 5C show the thermal expansion coefficient, bulk thermal conductivity and RT electrical conductivity versus percent volume of molybdenum in a copper matrix in example embodiments.

FIG. 5A shows a range of exemplary volume percent of molybdenum or molybdenum alloy in a copper matrix which may fall within the desired range of CTE. In an exemplary embodiment, the desired CTE may be in a range from about 11 to 14 millimeters per meter-degree Kelvin (mm/m-K). In a preferred embodiment, the CTE may be about 12 mm/m-K which may correspond to a percent volume of molybdenum or molybdenum alloy of about 30 volume percent. The CTE of the composite used as an interconnect in an SOFC may be selected, at least in part, to match the CTE of the material used in the individual fuel cells.

FIG. 5B shows a range of electrical conductivities at room temperature corresponding to the range of volume percentages of molybdenum or molybdenum alloys that have a desirable CTEs. In an example embodiment, a composite with 20-30 percent volume molybdenum in a copper matrix may have electrical conductivity in a range from $41 \times 10^6$ l/ohm-m to $51 \times 10^6$ l/ohm-m. In a preferred embodiment, the electrical conductivity may be about $44 \times 10^6$ l/ohm-m. Using reinforcing materials which are immiscible in a high-conductivity matrix may provide for a metal-matrix or in situ composite with high conductivity.

FIG. 5C shows a range of bulk thermal conductivity corresponding to the range of volume percentages of molybdenum or molybdenum alloys that have a desirable CTEs. In an example embodiment, a composite with 20-38 percent volume molybdenum in a copper matrix may have bulk thermal conductivity in a range from 28.4 to 36.5 (W/m-K)/(g/cm$^3$). In a preferred embodiment, the composite may have a bulk thermal conductivity of about 31.0 (W/m-K)/(g/cm$^3$). Using a composite with high bulk thermal conductivity may reduce thermal stresses during operation, which may result in using even further weight reductions for interconnects, by reducing the stresses experienced during operation.

FIG. 6 shows a detail view of an interconnect 120 of a solid oxide fuel cell 100 adjacent an anode 106 and a cathode 108 in accordance with an embodiment of the present invention. The interconnect has channels 125. The channels have a continuous, wave or sinusoidal profile. In an example embodiment, the interconnect may be a 0/90 lay-up metal-matrix composite or biaxial lay-up metal-matrix composite having crossed reinforcement fibers in two layers. Each side of the interconnect has a plurality of channels which run at 90 degrees with respect to the direction of the channels on the opposite face.

Embodiments described above illustrate but do not limit the invention. It should also be understood that numerous modifications and variations are possible in accordance with the principles of the present invention. Accordingly, the scope of the invention is defined only by the following claims.

I claim:

1. A method of fabricating an interconnect for a solid oxide fuel cell (SOFC), comprising:
    melting a charge comprising copper and from 20 to 38 volume percent molybdenum and then cooling the melted charge to form an ingot comprising a metallic composite having a copper matrix and spheroids comprising molybdenum dispersed within the matrix;
    forging the ingot followed by a first anneal to form a rough bar of metallic composite;
    swaging the rough bar followed by a second anneal to form a plurality of rods suitable for drawing;
    drawing the plurality of rods followed by a third anneal to form a plurality of wires of the metallic composite; and
    bundling and canning the plurality of wires to form a sheet of the metallic composite, wherein the sheet comprises a plurality of discontinuous, elongated, substantially uniaxial reinforcement fibers formed from the spheroids, and wherein the sheet is suitable for use as an interconnect in an SOFC.

2. The method of claim 1, wherein the drawing and third anneal are repeated a plurality of times before bundling and canning.

3. The method of claim 2, wherein the drawing and third anneal are repeated until the wires have a cross-sectional diameter of 0.5 mil to 3 mils.

4. The method of claim 1, further comprising one of hot isotropically pressing (HIP) or co-rolling the bundled and canned plurality of wires to sinter the plurality of wires together to form a sheet or plate of metallic composite.

5. The method of claim 1, wherein the plurality of rods are cold drawn and the third anneal is performed at a temperature of about 800° C.

6. The method of claim 1, further comprising providing an oxidation protection layer to at least one side of the sheet by one of co-rolling the sheet with a thin foil of one of iridium or rhenium or by vapor depositing a layer of one of iridium or rhenium onto the at least one side of the sheet.

7. The method of claim 1, wherein the spheroids comprise at least a small amount of one of titanium (Ti), zirconium (Zr), or hafnium (Hf) forming an alloy with molybdenum.

8. The method of claim 1, wherein the spheroids are of pure molybdenum.

9. The method of claim 1, wherein the sheet is a first sheet of the metallic composite, the method further comprising:
    bundling and canning the plurality of wires to form a second sheet of the metallic composite, the second sheet comprising a plurality of discontinuous, elongated, substantially uniaxial reinforcement fibers formed from the spheroids; and
    bonding the first and second sheets to form a lay-up composite sheet.

10. The method of claim 9, wherein bonding the first and second sheets comprises aligning the first and second sheets such that the reinforcement fibers of the first sheet and the reinforcement fibers of the second sheet run at different angles.

11. The method of claim 10, wherein the reinforcement fibers of the first sheet run at approximately 90 degree angle with respect to the reinforcement fibers of the second sheet.

12. The method of claim 9, wherein the bonding the first and second sheets comprises hot isotropically pressing the first and second sheets together at a temperature of about 900° C. under pressure.

13. The method of claim 9, further comprising forming a first plurality of channels on a top surface of the lay-up composite and a second plurality of channels on a bottom surface of the lay-up composite.

14. The method of claim 1, further comprising forming a plurality of channels on at least one surface of the sheet.

15. The method of claim 14, wherein the channels are formed by etching or machining.

16. The method of claim 14, wherein the channels are formed by rolling or pressing.

17. The method of claim 14, wherein the channels are about 1 to 2 millimeters deep and 1 to 2 millimeters across.

18. The method of claim 14, wherein the channels run substantially in a direction of the reinforcement fibers.

19. A solid oxide fuel cell (SOFC) interconnect comprising:
    a metal sheet comprising an air side and a fuel side, wherein the metal sheet comprises a metallic composite having a matrix comprising copper and a plurality of discontinuous, elongated, directional reinforcement fibers comprising molybdenum, and wherein the metal sheet is fabricated according to the method of claim 1; and
    an oxidation protection layer disposed on the air side of the metal sheet.

20. A solid oxide fuel cell (SOFC) comprising:
    a plurality of individual fuel cells, each individual fuel cell comprising an anode layer, a cathode layer and a catalyst layer between the anode layer and the cathode layer;
    a plurality of interconnects, wherein each interconnect separates adjacent individual fuel cells, and wherein each interconnect comprises the SOFC interconnect of claim 19.

* * * * *